July 27, 1954 R. C. MAIN 2,684,811
INDICATING MEANS FOR THERMOSTATIC DEVICES
Original Filed Oct. 30, 1947
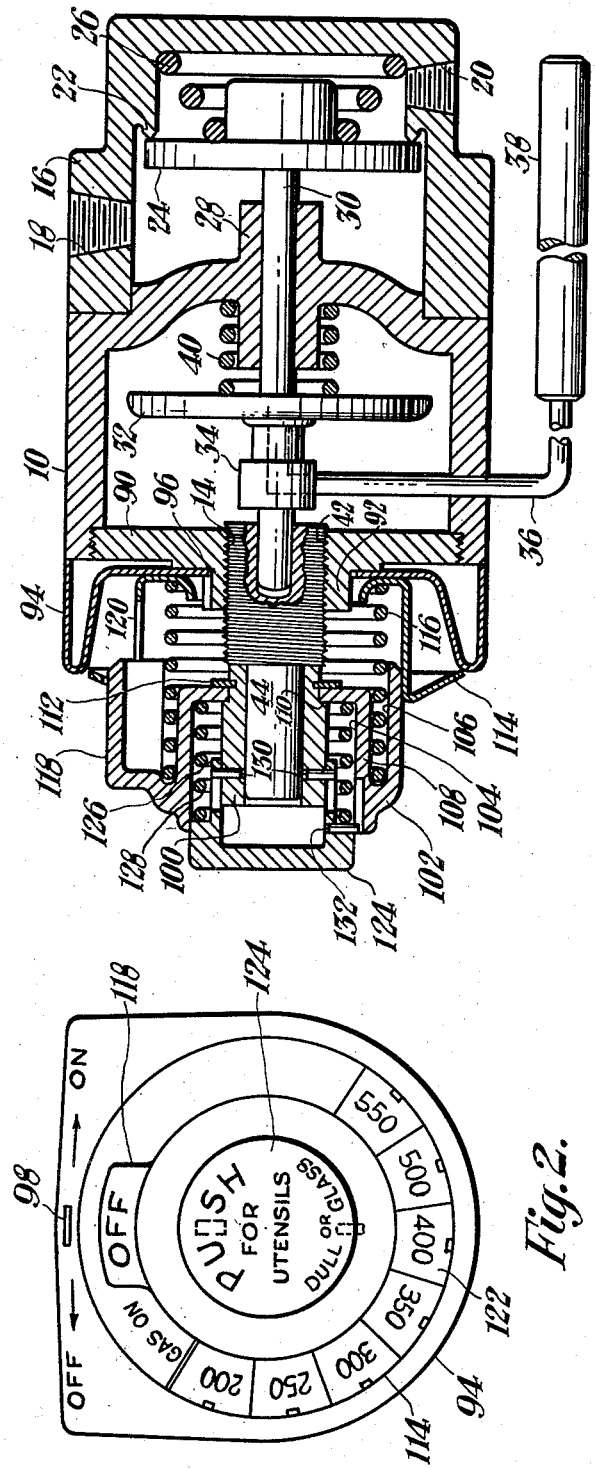
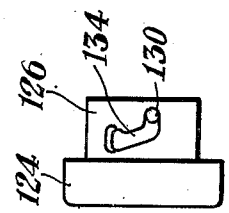
INVENTOR.
Robert C. Main.
BY
HIS ATTORNEY Patented July 27, 1954

2,684,811

UNITED STATES PATENT OFFICE 2,684,811

INDICATING MEANS FOR THERMOSTATIC DEVICES

Robert C. Main, Boston, Mass., assignor to Robertshaw-Fulton Controls Company, Greensburg, Pa., a corporation of Delaware Original application October 30, 1947, Serial No. 783,077, now Patent No. 2,607,533, dated August 19, 1952. Divided and this application January 10, 1952, Serial No. 265,880

2 Claims. (Cl. 236—94)

This application is a division of my application Serial No. 783,077, filed October 30, 1947, which issued August 19, 1952 as Patent No. 2,607,533.

This invention relates to temperature regulators for cooking appliances such as domestic gas and electric ranges and, more particularly, to the adjusting means by which different temperature settings are made.

In the preparation of foods by oven cooking it has long been known that uniform results are dependent to a large extent upon the correct use of oven utensils. An appreciable difference in cooking time or temperature is required for foods in utensils having dull or black surfaces compared with bright or shiny materials. Much data are available concerning the use of lower oven temperatures for an equal cooking time whenever glass, black, tin, enamel or any utensil having a dull or opaque surface is used; the adjustment being necessary due to most cook-book formulas being developed with shiny pans in mind. The necessity for adjustment is attributed to the increased radiant heat absorption of the dull or black utensils.

The lower oven temperatures required for dull, black or glass utensils averages 75° F. less over the usual cooking range than that specified in standard cook-books. It would be inconvenient, irksome and subject to miscalculation if the operator were required to arrive at the necessary adjustment mentally before setting the oven thermostat. Hence, an object of this invention is to facilitate the production of properly cooked foods regardless of the type of surface finish on the utensil.

Another object of the invention is to eliminate the necessity for calculation or experimentation on the part of the operator in setting the regulator for the different types of utensil and to render the operation spontaneous.

Another object of the invention is to render cooking operations more economical by encouraging the use of utensils having greater heat absorbing capacity.

Another object of the invention is to secure the improved results without unduly complicating the standard adjusting means or advancing the cost of manufacture.

Other objects and adantages will become apparent from the following description taken in connection with the accompanying drawings wherein:

Fig. 1 is a longitudinal sectional view through a conventional temperature regulator having the invention applied thereto;

Fig. 2 is an end elevation of the structure shown in Fig. 1; and

Fig. 3 is a plan view of a detail shown in Fig. 1.

Referring more particularly to the preferred form of the invention shown in Figs. 1 to 3 inclusive of the drawings, the temperature regulator includes a casing 10 of cup-shaped form having the open end thereof provided with a closure cap 90 provided with an axial threaded opening 14. An end casing 16, also of cup-shaped form, has its open end secured to the bottom of the body 10 and is provided with a pair of lateral openings 18 and 20 forming inlet and outlet passageways, respectively, for the fuel to be regulated. Formed intermediate the passageways 18, 20 is an annular seat 22 with which a control element or disc valve member 24 is cooperable to control the flow of fuel between the ports 18 and 20. The valve member 24 is biased away from the valve seat 22 by a coil spring 26 supported against the bottom surface of the end casing 16.

The bottom of the body 10 is provided with oppositely disposed projections or bosses 28 which are suitably apertured for the reception of a valve stem 30 which extends into operative engagement with the valve member 24. The opposite end of the valve stem 30 extends into the casing 10 and engages with a diaphragm element 32 forming part of a temperature responsive means for moving the valve member 24 relative to its seat 22. The diaphragm element 32 is connected through a hollow stud 34 with a capillary tube 36 and a bulb member 38 which complete the temperature responsive means. The bulb member 38 is adapted to be located in the oven of a domestic gas range and will cause expansion or contraction of the diaphragm element 32 in response to changes in temperature which produce changes in the volume of the liquid with which the temperature responsive means is filled.

A coil spring 40 is interposed between the diaphragm 32 and the bottom of the casing 10 for biasing the diphragm in one direction and causing the stud 34 to maintain contact with the open end of an operating shaft 42 which is disposed within the closure cap 90. The shaft 42 is suitably threaded for engagement with the threaded opening 14 and has a reduced end 44 projecting beyond the closure cap 90 by means of which the shaft 42 may be rotated to impart longitudinal movement thereto. A stepped collar 92 is provided on the outer side of the closure cap 90 for supporting a bezel member 94 of sheet material. Means for preventing relative rotation between the bezel member 94 and the closure cap 90 take the form of a lug 96 on the inner periphery of the bezel member 94 which projects into the collar 92 which is slotted for this purpose. The bezel member 94 is provided with a reference point 98 having cooperating arrows indicating "Off" and "On" directions of rotation.

A reduced end 44 of the shaft 42 carries a sleeve 100 which is press-fitted or otherwise detachably secured thereto. A knob 102 has an axial opening 104 in its outer end face and an annular recess 106 in the opposite end face respectively, which are concentrically arranged and define an annular collar 108 therebetween. The collar 108 has an inturned end engaging a shoulder 110 on the inner end of the sleeve 100. A locking member in the form of a spring washer 112 projects from the sleeve 100 adjacent the shoulder 110 for securing the knob 102 in position on the sleeve 100.

An annular member 114 of suitable sheet material and of S-shaped form in cross-section is located between the knob 102 and the bezel member 94. Yieldable means in the form of a coil spring 116 extends between the end of the recess 106 and the knob 102 and one turn of the S-shaped annular member 114 for holding the latter in position, together with the bezel member 94, against the closure cap 90. The knob 102 is provided with an upstanding rib 118 carrying on its outer end face the legend "Off" and having its inner end projecting within a recess 120 formed in the annular member 114 for this purpose. The knob 102 and the annular member 114 are thus interlocked so that rotation of the knob 102 will cause rotation of the annular member 114 relative to the bezel member 94 which remains stationary with the casing 10 due to its interlocking arrangement with the closure cap 90 as previously described.

The annular member 114 has the other turn of the S-shaped section thereof exposed between the knob 102 and the bezel member 94 and carries thereon a scale 122 of temperature indicia ranging from the lowest to the highest temperatures in counter-clockwise arrangement. The temperature indicia on the scale 122 are adapted for registry selectively with the reference point 98 on the bezel member 94 when the knob 102 is rotated. Means now to be described are effective for causing rotation of the shaft 42 upon such manipulation of the knob 102 serving to register the temperature indicia 122 with the reference point 98.

Slidably fitted within the axial opening 104 of the knob 102 is a push-button 124 having a reduced inner end portion 126 serving to accommodate biasing means in the form of a coil spring 128 extending between the push-button 124 and the inturned end of the collar 108 on the knob 102. The push-button 124 is restrained from movement under this bias outwardly of the knob 102 by a pair of pins 130 projecting from the sleeve 100 into engagement with the reduced end 126 of the push-button 124 which is suitably slotted for this purpose. As will be described more fully hereinafter, the push-button 124 and pins 130 have special cooperative engagement for an additional purpose relative to the invention.

Means for preventing relative rotation between the push-button 124 and the knob 102 takes the form of a pin 132 extending from the knob 124 into engagement with a suitably slotted portion in the wall of the axial opening 104 in the knob 102. The arrangement thus far described causes any rotative movement of the knob 118 to be transmitted to the push-button 124 through the pin 132 and from the push-button 124 to the sleeve 100 through the pins 130. As the sleeve 100 is detachably fixed to the shaft 42 the latter will also be rotated upon manipulation of the knob 102 for this purpose. It will further be observed that endwise force applied to the knob 102 will serve to withdraw the sleeve 100 from the shaft 42 together with the associated parts and permit disassembly of the annular member 120 and the bezel member 94 therewith.

The regulator is shown with the parts in the position they occupy when in the "Off" position with the valve member 24 engaging the seat 22 and cutting off the supply of fuel to the oven burner. In starting a cooking operation, and assuming that a shiny utensil is being used, the knob 102 is rotated in a clockwise direction causing longitudinal movement of the shaft 42 due to its threaded connection with the closure cap 90. Clockwise rotation of the shaft 42 causes it to move to the left as viewed in Fig. 1 of the drawings due to the left-hand threaded engagement with the closure cap 90. The bias of the springs 40 and 26 thereupon causes the diaphragm element 32 to move to the left and the valve member 24 to be unseated, respectively. The distance which the valve member 24 is unseated is determined by the temperature to which the annular member is set as indicated by the particular temperature indicia on the scale 122 which is in registry with the reference point 98 on the bezel member 94.

As the oven temperature increases, the diaphragm element 32 will expand and move the valve member 24 toward its seat 22 through operation of the valve stem 30 and against the bias of the coil spring 26. Should the temperature of the oven become reduced below the setting of the knob 102, then the diaphragm element will respond thereto by contracting and causing the valve member 24 to move away from its seat 22 under bias of the coil spring 26. Thus the valve member 24 is positioned to establish a controlled temperature corresponding to the selected temperature setting by operation of the knob 102. It is apparent that the operation of the regulator under such circumstances is in accordance with conventional practice and any further explanation is deemed unnecessary.

In the event that a cooking operation is to be conducted with a dull surface or glass utensil as previously described, then a setting approximately 75° F. below that required for shiny utensils may be used. This temperature differential is approximately correct over that specified in standard cook books due to the recipes being based for the most part on the use of shiny metal utensils and the device of this invention is adapted to automatically set such temperature differential in the thermostat.

The push-button 124 carries on its outer end face the legend "Push for utensils dull or glass." The arrangement contemplates that such operation of the push-button will automatically reduce the normal temperature setting of the knob 124 by approximately 75° F. As shown more clearly in Fig. 3 of the drawings, the reduced end 126 of the push-button 124 has a pair of oppositely disposed slots 134 extending circumferentially at a suitable angle therein in opposite directions. The side walls of these slots 134 engage the pins 130 and act as a camming arrangement to move the sleeve 100 and therefore the shaft 42 through an arc of rotation whenever the push-button 124 is operated. As the knob 102 is secured by the pin 132 to the button 124, no relative rotation between these parts can occur.

The movement of the pins 130 to their new position as described when the valve member 24 is positioned away from its seat causes sufficient movement of the shaft 42 in a right-hand direction to lower the temperature setting by approximately 75° F. Thus, the valve member 24 is moved toward its seat from its original setting and against the bias of the springs 40 and 26. When the knob 102 is rotated to the "Off" position upon completion of the cooking operation the final 75° F. rotation causes the pins 130 to return to their original positions.

From the foregoing, it will be apparent that merely setting the knob 102 to establish the cook book temperature on the scale 122 relative to reference point 98 will serve to maintain a temperature which is correct for shiny utensils. However, if a dull or glass utensil is being used, then the push-button is operated while the knob 102 is positioned in the selected temperature setting. A temperature setting approximately 75° F. lower than the original temperature setting is thus automatically secured and a temperature which is correct for dull or glass utensils will be maintained.

It will be understood that many charges may be made in the details and arrangement of parts within the scope of the appended claims without departing from the spirit of the invention.

It is claimed and desired to secure by Letters Patent:

1. A temperature regulator for appliances having a source of radiant heat for a cooking utensil, comprising in combination, a casing, temperature responsive control means in said casing, a rotatable shaft operatively engaging said control means and projecting from said casing, a bezel member mounted on said casing for non-rotation relative thereto and having a reference point thereon, a sleeve secured to the projecting end of said shaft, a knob carried by said sleeve and being operable for positioning said control means to establish a controlled temperature, an annular member mounted upon said knob and being engageable with said bezel member, said annular member having temperature indicia for registry selectively with said reference point on said bezel member, yieldable means operative between said knob and said annular member for supporting the latter and said bezel member relative to said casing, a driving connection between said knob and said annular member for rotating the latter to a selected temperature setting by operation of said knob, a push-button mounted on said sleeve and extending partly within said knob for slidable movement relative thereto, yieldable means for biasing said push-button in one direction relative to said knob, and interengaging means on said push-button and said sleeve for restraining said biasing movement and imparting limited rotation to said shaft upon a slidable movement of said push-button in an opposite direction, said limited rotation being sufficient to vary said controlled temperature substantially 75° F. to compensate for variation in the radiant heat absorption of utensils of different materials and/or surface finish.

2. A temperature regulator comprising a pair of relatively rotatable members, one said member having a reference point for registry selectively with a plurality of temperature indicia on the other said member to thereby indicate selected temperature settings, a control element movable between controlling positions, temperature responsive means for moving said element, adjusting means operatively connected to said last named means for adjusting the same through a range of temperature settings, and means connecting said adjusting means to said other member for positioning the former to establish a controlled temperature normally corresponding to said selected temperature setting, said last named means including a push button mounted on said other member for slidable movement relative thereto, and cam means for imparting limited rotation to said adjusting means upon slidable movement of said push button for varying the position of said adjusting means relative to said other member while retaining said selected temperature setting.

References Cited in the file of this patent

UNITED STATES PATENTS

| Number | Name | Date |
|---|---|---|
| 2,153,886 | Grayson | Apr. 11, 1939 |